(12) United States Patent
Arnemann

(10) Patent No.: US 8,534,170 B2
(45) Date of Patent: Sep. 17, 2013

(54) ROTATING PIPE MACHINING DEVICE

(75) Inventor: Scott Arnemann, Rolling Meadows, IL (US)

(73) Assignee: Illinois Tool Works Inc., Glenview, IL (US)

( * ) Notice: Subject to any disclaimer, the term of this patent is extended or adjusted under 35 U.S.C. 154(b) by 856 days.

(21) Appl. No.: 12/723,759

(22) Filed: Mar. 15, 2010

(65) Prior Publication Data

US 2011/0219920 A1 Sep. 15, 2011

(51) Int. Cl.
 *B23B 5/08* (2006.01)
 *B23D 21/06* (2006.01)

(52) U.S. Cl.
 USPC .............. 82/113; 82/128; 82/130; 82/131; 82/147

(58) Field of Classification Search
 USPC .............. 82/70.2, 101, 113, 130, 131, 147
 See application file for complete search history.

(56) References Cited

U.S. PATENT DOCUMENTS

| 4,939,964 | A  | * | 7/1990 | Ricci ........................... | 82/113 |
| 5,054,342 | A  |   | 10/1991 | Swiatowy | |
| 5,549,024 | A  | * | 8/1996 | Ricci ........................... | 82/113 |
| 6,427,567 | B1 | * | 8/2002 | Ricci et al. .................. | 82/113 |
| 7,320,268 | B2 | * | 1/2008 | Kawashima ................ | 82/113 |
| 7,383,758 | B2 | * | 6/2008 | Place et al. .................. | 82/113 |

* cited by examiner

*Primary Examiner* — Will Fridie, Jr.
(74) *Attorney, Agent, or Firm* — Klintworth & Rozenblat IP LLC

(57) ABSTRACT

A machining device has a stationary member and a rotating member. A plurality of bearings on one of the members engages a surface of the other. At least one of the bearings is radially fixed, while the remainder of the bearings are radially adjustable. In another aspect of the invention, the bearings are rotatable on a first cylindrical portion of a mounting shaft that has a second cylindrical portion attachable to the machine. A radial undercut is provided around a flange between the first cylindrical portion and the second cylindrical portion.

18 Claims, 9 Drawing Sheets

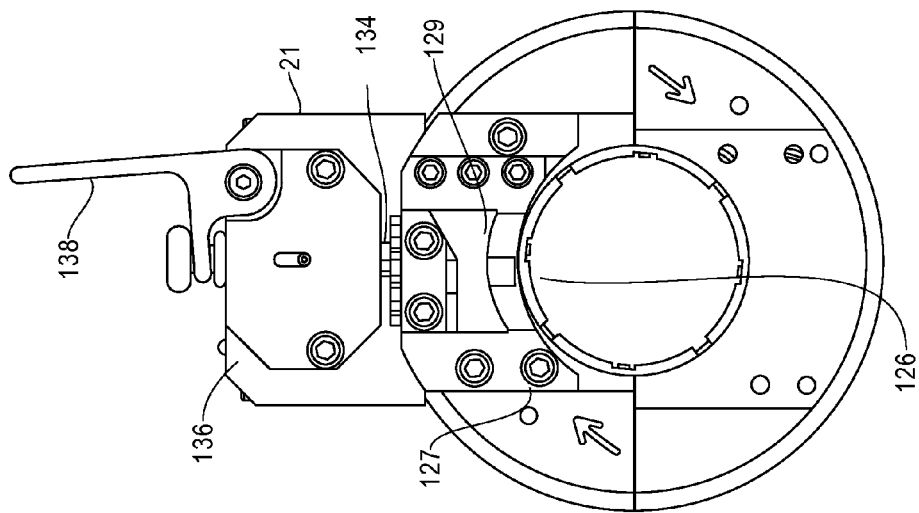
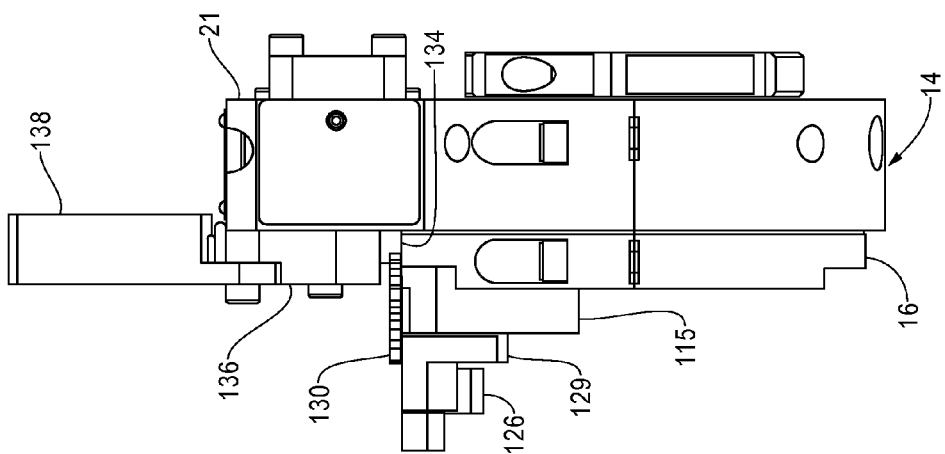
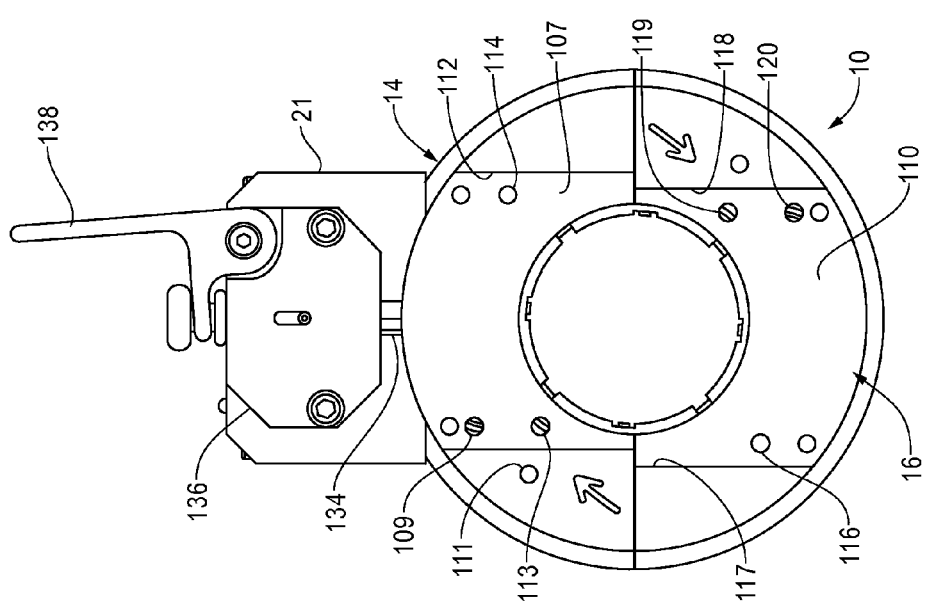

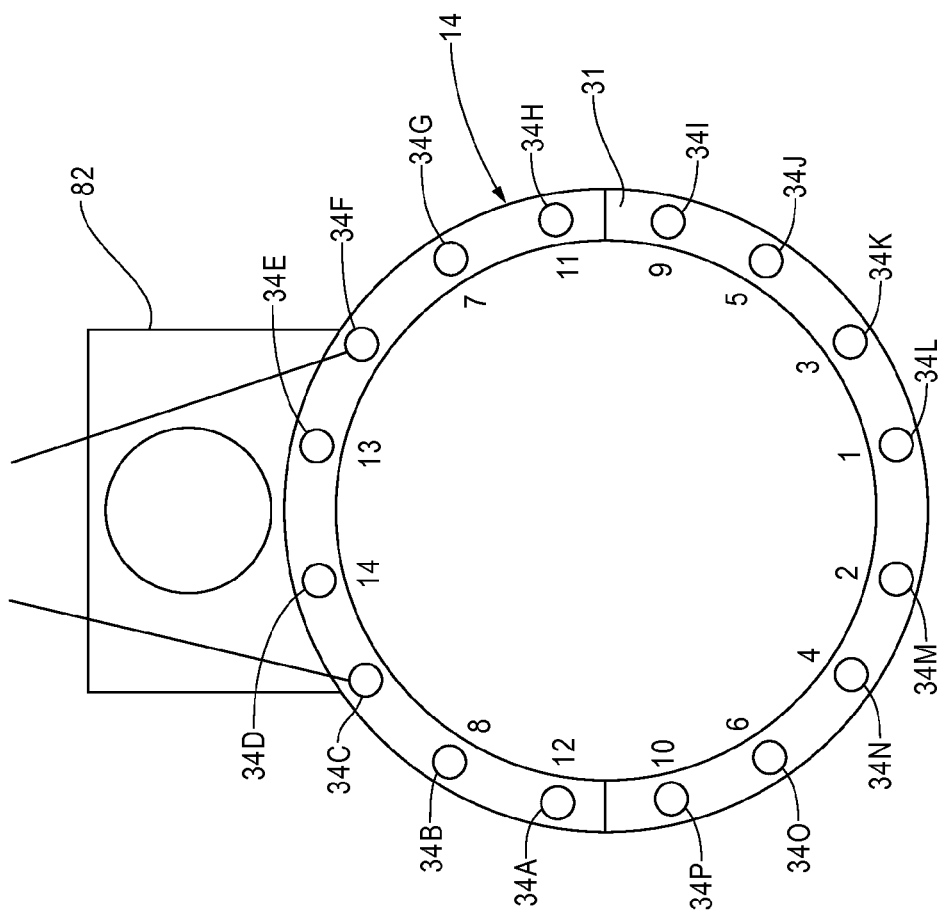

ROTATING PIPE MACHINING DEVICE

The present invention relates to machines that cut pipe, and prepare the ends of pipe for welding, and in particular to a split frame pipe machining device.

BACKGROUND OF THE INVENTION

The present invention relates to pipe preparation machines for cutting a length of pipe, and preparing the end of the pipe to receive a welding. Where the end of a length of pipe is accessible, a cutting machine or pipe preparation machine may be fitted over the open end of the pipe. Where both ends of the pipe are welded into place, a split frame machine having an annular stationary member and an annular rotating member with both the annular members divisible into semicircular sections is required.

To cut through the wall of a length of pipe, or to prepare the distal end of the pipe, a pipe preparation machine includes an annular portion that attaches to the outer surface of the pipe and a rotating annular portion that retains a tool for working against a surface of the pipe. Where the rotating portion of the machine rides on bearings that extend around the circumference of either the stationery member or the rotating member, the bearings must be carefully aligned so as to evenly distribute the forces applied thereto and the rotating portion rotates about the same axis that defines the center of the stationary portion. If the bearings are not properly aligned, one or more of the bearings will be subjected to excessive forces and become worn. As the bearings wear, the gearing between the rotating and stationary members will also become misaligned, with the alignment worsening as the bearings wear until failure occurs in either the bearings or the gearing.

Each of the bearings that facilitate the rotation of the rotatable member is mounted on a shaft that is in turn received in a bore in one of the stationary members. To operate properly, the forces applied to the various bearings must be balanced, which requires radial positioning of the bearings with respect to the common axis to a fraction of a thousandth of an inch. However, the bores that receive the mounting shafts for the bearings cannot be positioned to the degree of accuracy required to maintain the proper balance of forces against the various bearings. Accordingly, it has become the practice to mount the bearings on shafts having an attachment shank that is offset with respect to the portion that receives the bearing. By rotating the attachment shank within a mounting bore, the bearing can be radially moved to balance the forces thereon. This structure is more fully described in Swiatowy, U.S. Pat. No. 5,054,342 issued Oct. 8, 1991, the text of which is incorporated herein by reference.

In a split frame device such as described in the Swiatowy referenced mentioned above, both the stationary annular member and the rotating annular member are divisible into semi-circular halves which may be disassembled and reassembled around a length of pipe. As acknowledged above, the operators of such devices have difficulty in balancing of the forces on the bearings. Even after the forces have been balanced, it has been found that regardless how tightly the retaining nuts are tightened, the bearings of prior art machines tend to move out of balance over a relatively short period of time.

Each of the bearings is mounted on an off-center shaft having a threaded distal end for receiving a nut that is tightened to lock the shaft in the desired orientation. A hex screw driver is inserted into a hex bore in the end of the shaft to retain the off-center bearing in its desired orientation as the nut is tightened. It has been found, however, that as the nut is tightened the shaft will tend to rotate through a small angle regardless of the technician's efforts to resist such movement. Furthermore, split frame pipe machines typically have ten to sixteen of such bearings, and it is virtually impossible for a technician to equally balance the forces against all of the bearings. It would be desirable, therefore, to provide a pipe preparation machine for which it would be simpler to adjust the forces on the bearings thereof, and that would retain its adjustment over a longer period of time.

SUMMARY OF THE INVENTION

Briefly, the present invention is embodied in a pipe machining device having an annular stationary member attachable to a pipe and an annular rotating member that is rotatable with respect to the stationary member and supports a tool for engaging the pipe. The device has a plurality of bearings mounted around a circumference of one of the annular members, with each of the bearings having an outer rim that engages a surface of the other of the annular members.

In accordance with the invention, at least one of the plurality of bearings is rotatable about an axis that is radially fixed with respect to the first annular member. The remainder of the plurality of bearings are rotatable about an axis that is radially adjustable with respect to the axis of the first annular member.

In a preferred embodiment of the invention, at least one of the bearings is rotatable about an axis that is radially fixed with respect to the axis of the first annular member.

In accordance with another aspect of the invention, one of the bearings has a central bore that receives a first cylindrical portion of a mounting shaft. The mounting shaft has a second cylindrical portion for attachment to the first annular member with a radial shoulder between the mounting shaft and the large diameter bore. In accordance with this embodiment of the invention, the shoulder has a undercut extending into a surface thereof that abuts against a surface of the first rotatable member.

Preferably, in this embodiment two of the mounting shafts are axially aligned with the cylindrical mounting portion for receiving a bearing such that it is not radially adjustable with respect to the first annular member.

BRIEF DESCRIPTION OF THE DRAWINGS

A better understanding of the invention will be had after a reading of the following detailed description taken in conjunction with the drawings wherein:

FIG. 4 is a front end view of the machine shown in FIG. 1 with the tool holders removed;

FIG. 5 is a side view of the machine shown in FIG. 1 with a radially moveable tool holder attached thereto;

FIG. 6 if a front view of the machine and tool holder shown in FIG. 5;

FIG. 10 is a layout of the bearing mounting holes in the stationary member of the machine shown in FIG. 1;

DETAILED DESCRIPTION OF PREFERRED EMBODIMENT

Figure 1:
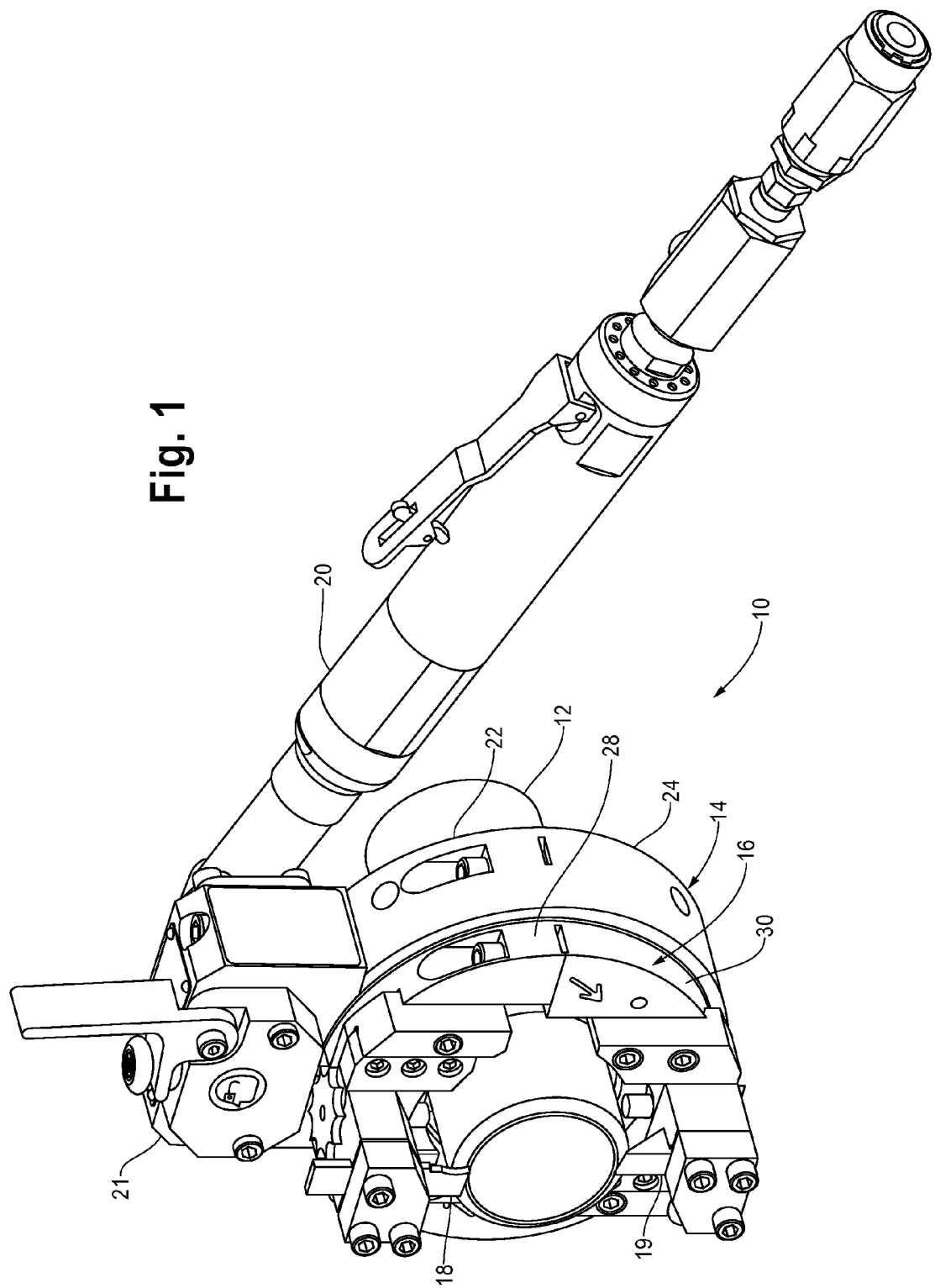
FIG. 1 is an isometric view of a rotatable machine mounted on a pipe.
Figure 2:
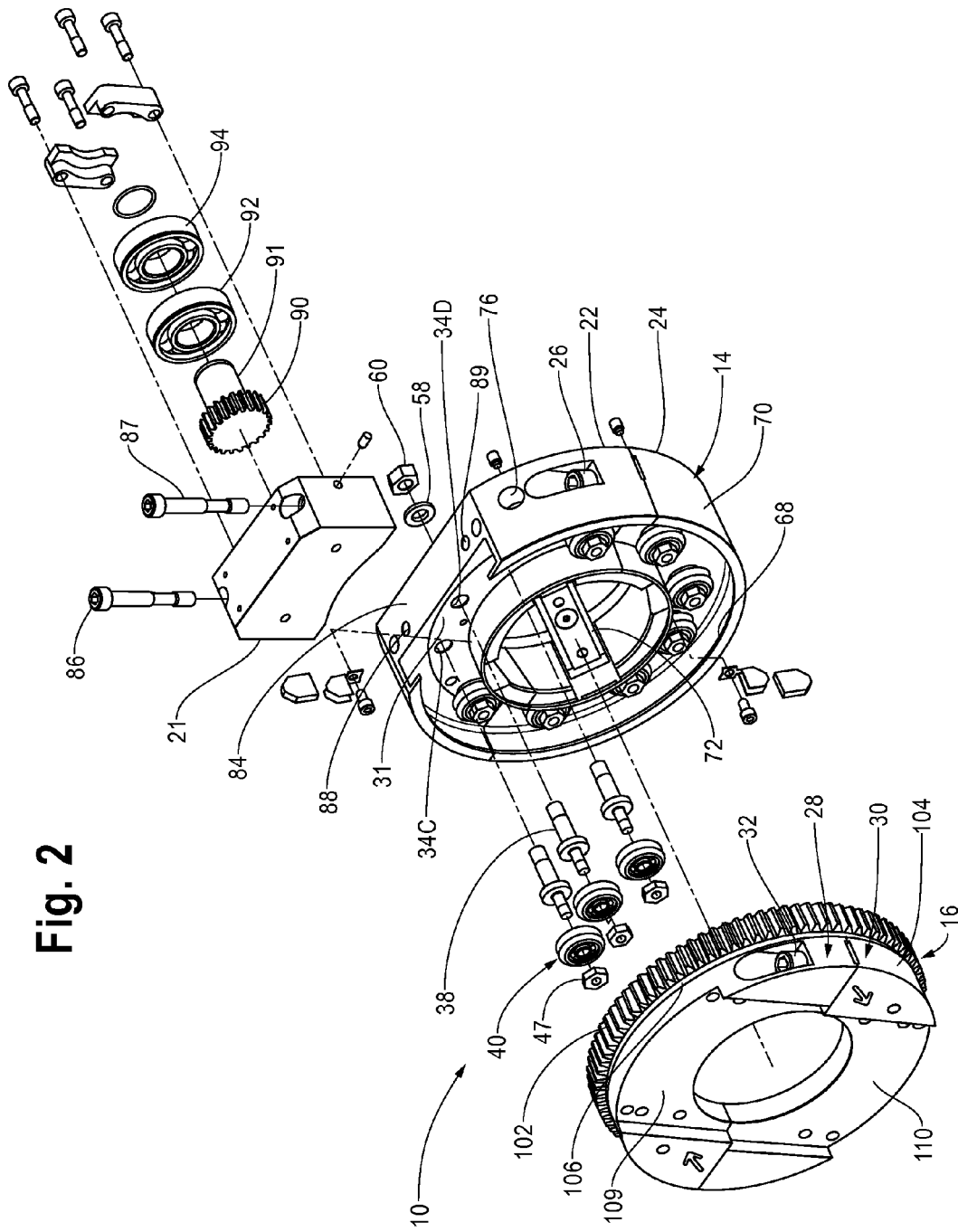
FIG. 2 is an exploded view of the machine shown in FIG. 1.
Figure 3:
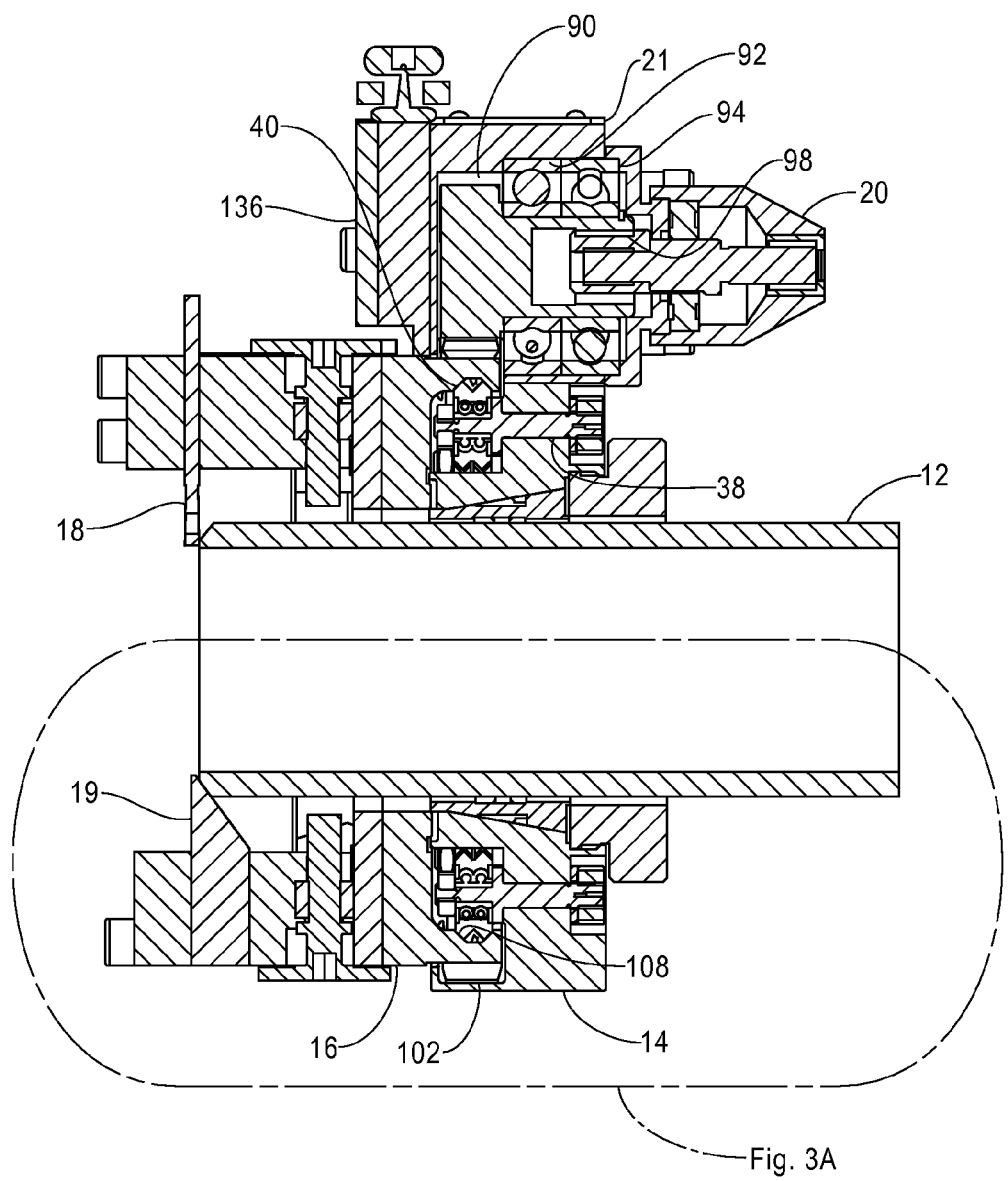
FIG. 3 is a cross-sectional view of the machine shown in FIG. 1.

Referring to FIGS. 1, 2, and 3, a pipe machining device 10 for cutting or machining the end of a length of pipe 12 includes an annular stationary member 14 that is attachable to the outer surface of the pipe 12 and an annular rotatable member 16 that is rotatable with respect to the stationary member 14 for retaining a tool. Although FIGS. 1 and 2 depict the device 10 simultaneously retaining two tools 18, 19, it is common to use device 10 with one tool 18, 19 at a time. The annular rotatable member 16 is rotated with respect to the stationary annular member 14 by a motor 20 and a drive assembly within a pinion housing 21 on the annular stationary member 14. A tool mounting, unnumbered, urges the tool 18, 19 against a surface of the pipe 12 to thereby cut into the surface, or machine the surface a needed.

Referring to FIGS. 1, 2, 3, 3A, and 10, the annular stationary member 14 consists of a first arcuate portion 22 and a generally complementary second arcuate portion 24 that are retained together by bolts, one of which 26 is visible, that extend through bores in one half 22 and into threaded bores in the other half 24 to retain the two arcuate halves in rigid mutual alignment. In similar fashion, the annular rotatable member 16 includes a first arcuate portion 28 and a complementary second arcuate portion 30, with the two arcuate halves 28, 30 being retained together in mutual aligned relationship by means of bolts, one of which 32 is visible, extending through aligned bores.

Positioned around the circumference of the annular stationary member 14 and extending into an annular planar surface 31 thereof are a plurality of spaced apart parallel mounting bores 34A-34P, in this case sixteen bores, half of which extend through the first arcuate portion 22 and the remainder of which extend through the second arcuate portion 24. The bores 34A-34P all extend parallel to the length of the pipe 12 retained in the device 10 and each of the mounting bores 34A-34P rotatably receives the shank 36 of a mounting shaft 38 for rotatably retaining a bearing 40.

Figure 11:
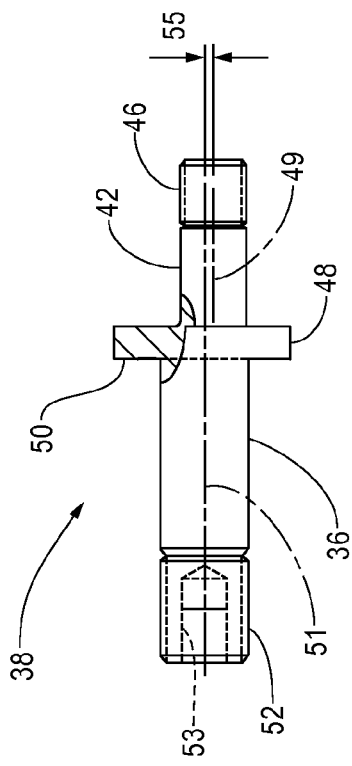
FIG. 11 is a side elevational view of an acentric pin for retaining bearings in the machine shown in FIG. 1.
Figure 12:
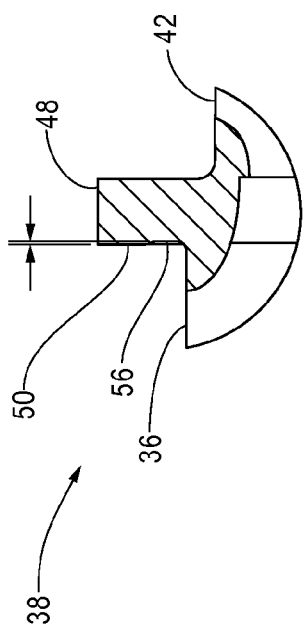
FIG. 12 is a fragmentary enlarged cross-sectional view of the pin shown in FIG. 11.

As best shown in FIGS. 2, 11, and 12, each of the plurality of bearings 40 has an annular central portion 41 with a bore, unnumbered, sized to receive the forward end 42 of the mounting shaft 38, and rotatable around the central portion 41 is an annular co-axial outer race. The outer race has opposing frustoconical surfaces 43, 45 that are received in an annular groove on the rotating member 16, as further described below.

The forward end 42 of each of the mounting shafts 38 is a cylindrical stud sized to tightly receive the annular central portion 41 of a bearing 40 and the end thereof has a threading 46 to receive a nut 47 for retaining the bearing 42. Rearward of the forward end 42 is a radial flange 48 having a forward surface, unnumbered, against which a bearing 40 is retained, and a planar rearward surface 50. Extending perpendicular to the rearward surface 50 and parallel to the longitudinal axis 49 of the cylindrical forward end 42 is the shank 36. The shank 36 has a threaded distal end 52 for receiving a nut 60 for retaining the mounting shaft 38 in one of the bores 34A-34P. Extending axially into the threaded distal end 52 is an axial bore 53 with a hex cross-section sized to receive a standard hex-shaped Allen wrench. The cylindrical shank 36 has a longitudinal axis 51 that is offset a short distance 55 from the longitudinal axis 49 of the cylindrical forward end 42 such that changing the angular orientation of the mounting shank 36 within its associated bore 34A-34P will radially move the bearing 40 mounted thereon with respect to the center, unnumbered, of the stationary annular member 14.

As best shown in FIG. 12, at the junction between the rearward planar surface 50 of the radial flange 48 and the shank 36 is an annular undercut 56 that extends into the planar rear surface 50 of the flange 48. As a consequence of the annular undercut 56, there is no radius or fillet between the cylindrical wall of the shank 36 and the plane defined by the rearward surface 50. Furthermore, the annular undercut 56 extends across approximately one-half of the radial distance between the wall of the shank 36 and the annular outer circumference of the radial flange 48. This structure causes the surface 50 near the outer circumference of the flange 48 to contact the surface 31 of the stationary member 14. Since the outer circumference of the flange 48 is the furthest portion from the axis of the shank 36, it offers the maximum resistance to rotation of the shank 36 and more securely retains the shank 36 against loss of its radial adjustment.

The mounting shafts 38 with an associated bearing 40 and nut 47 on the forward end 42 thereof have their respective shanks 36 inserted into fourteen of the sixteen mounting bores 34A-34P in the annular stationary member 14 and are retained in their desired angular orientation with a washer 58 and the retaining nut 60 threaded on the end 52 thereof. To tighten the retaining nut 60 while the shaft 38 is in a desired angular orientation, the shaft 38 is held against rotation using an Allen wrench inserted in hex bore 53 while a conventional wrench is used to tighten the nut 60 thereby compressing the outer circumference of the surface 50 of flange 48 against the surface 31 of the stationery annular member 14.

Figure 3A:
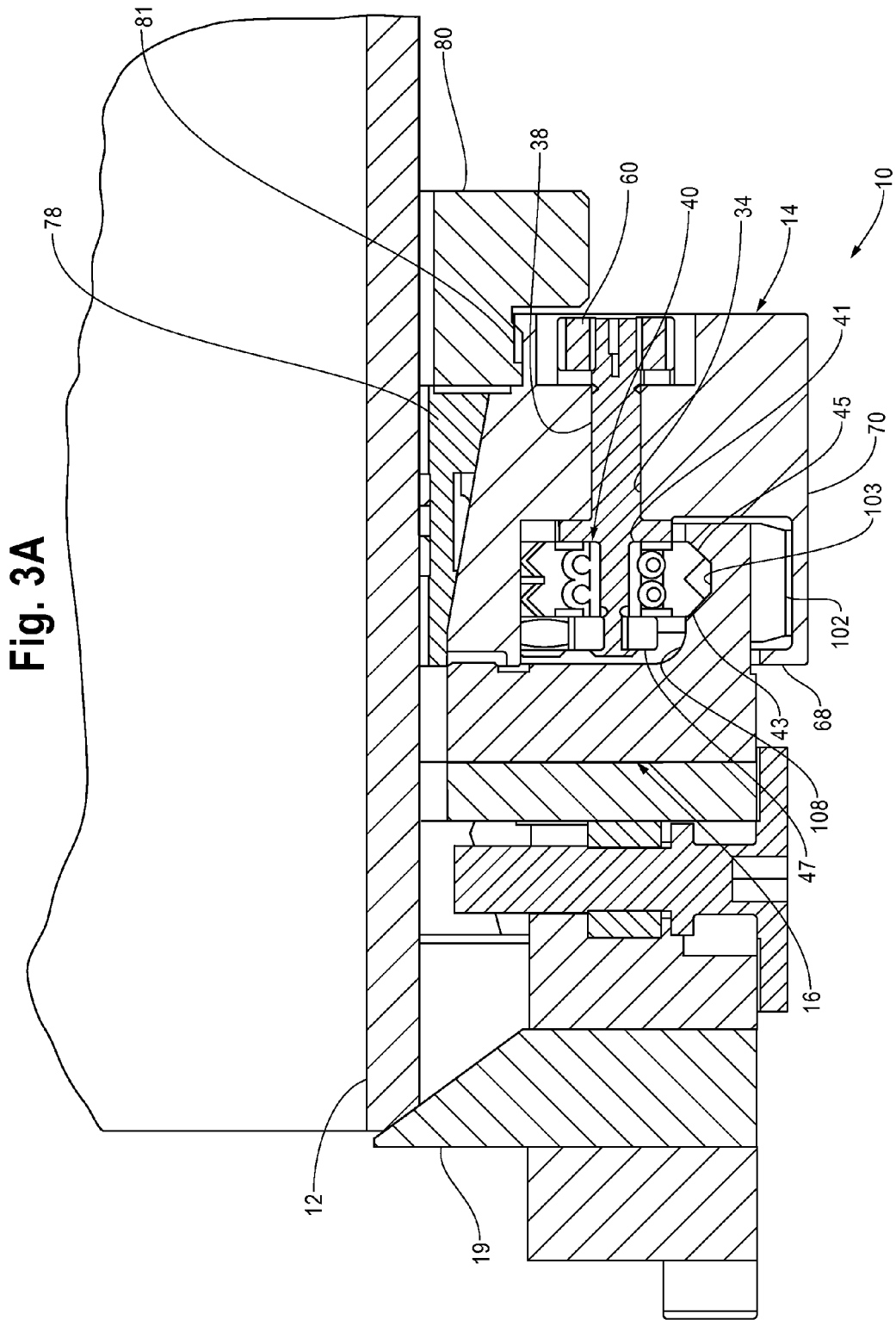
FIG. 3A is a fragmentary enlarged cross-sectional view of the machine as shown in FIG. 3.

Referring further to FIGS. 2, 3, and 3A, the annular stationary member 14 also includes a forwardly directed annular outer lip 68 that extends radially inwardly from the cylindrical outer surface 70 thereof, with the outer lip 68 adapted to engage an annular ridge of the rotating member 16 for retaining the rotating member 16 to the stationary member 14 as is further described below.

The annular stationary member 14 further includes a suitable means for retaining the device to the pipe 12. In the embodiment depicted in FIG. 2, the stationary member 14 is retained by a plurality of radially moveable shoes, one of which 72 is visible. Each of the shoes 72 is radially moveable by means of a threaded screw, not shown, extending through a radial bore, one of which 76 is visible, such that rotation of the screw radially moves the associated shoes 72 to thereby compress the shoe 72 against the surface of the pipe 12 to retain the stationary member 14.

As shown in FIG. 3A, in an alternate embodiment for retaining the stationary member 14 to the pipe 12, a tubular collet 78 is provided. In this embodiment, the collet 78 has a plurality of radially moveable segments, with the outer surfaces of the combined segments defining a frustoconical surface. A rotatable sleeve 80 having a male threaded portion 81 that engages female threads on the stationary member 14, not numbered, urges the collet 78 into a frustoconical portion of the stationary member to compress the frustoconical segments against the surface of the pipe 12 to thereby retain the rotatable member 14 to the pipe 12.

Referring further to FIGS. 2 and 3, the stationary member 14 also includes the pinion housing 21 which is mounted on a planar portion 84 of the outer surface of the stationary member 14 and retained in place by a plurality of bolts 86, 87 threadedly received in threaded holes 88, 89. Within the pinion housing 21 is a pinion 90 having a shaft 91 retained in bearings 92, 94. The pinion shaft 91 has an axial bore 98 in the distal end thereof, and the bore 98 has a rectangular cross-section for receiving the end of an output of a motor assembly 20.

Referring further to FIGS. 2, 3, and 3A, the outer surface of the annular rotatable member 16 includes a rearwardly positioned annular bull gear 102. The bull gear 102 is formed in halves with the two halves extending around the first and second arcuate portions 28, 30. When the two arcuate portions 28, 30 are retained together with the bolts 32, the annular bull gear 102 is formed. Forwardly of the annular bull gear 102 is a smaller diameter cylindrical surface 104 having a diameter that is a little smaller than the diameter of the inner annular lip 68. Between the bull gear 102 and the cylindrical surface 104 is a radial shoulder 106 having a diameter greater than the diameter of the inner annular lip 68 such that the lip 68 will engage the annular shoulder 106 and rotatably retain the rotatable member 16 to the annular stationary member 14.

As best shown in FIG. 3A, radially inwardly of the bull gear 102, the rotatable member 16 has a counter bore 108 having an annular groove 103 around the inner surface into which the frustoconical surface 43, 45 of the bearings 40 are received. It is the engagement of the frustoconical surfaces of the bearings 40 in the annular groove 103 of the rotating member 16 that retains these two members 14, 16 in aligned relationship. Accordingly, the positioning of the various bearings 40 around the circumference of the annular stationary member 14 is critical to maintain the concentric relationship of the annular rotating member 16 with the annular stationary member 14.

Referring to FIGS. 2 and 4, the forward surface 107 of the first arcuate portion 28 of the annular rotating member 16 has parallel spaced apart retainer surfaces 111, 112 and threaded bores 109, 113, 114 for retaining a tool mounting assembly such as the axially moveable parting tool 18 shown in FIG. 1. Similarly, the forward surface 110 of the second arcuate portion 30 also has parallel spaced apart retaining surfaces 117, 118 and threaded bores 116, 119, 120 for retaining a second tool mounting assembly such as the radially moveable beveling tool 19 shown in FIG. 1. The retaining surfaces 111, 112 and bores 109, 113, 114 of the first arcuate portion 28 are identical to the retaining surfaces 117, 118 and bores 116, 119, 120 of the second arcuate portion 30 such that both are adapted to receive any one of a number of pipe machining devices including devices 115 and 121 described below. The various tools may be either axially moveable or radially moveable with respect to the pipe 12, and devices 115 and 121 for retaining such tools are considered examples of each.

Referring to FIGS. 5 through 8, a radially moveable tool mounting device 115 is suitable for retaining a parting, or cutting tool 126 for cutting the length of pipe 12 perpendicular to its longitudinal axis. The mounting device 115 includes a stationary body 127 with dimensions and mounting holes suitable for attachment between the retaining surfaces 111, 112, 117, 118 of the first and second arcuate portions 28, 30. The body 127 includes a track 128 for slideably retaining a radially moveable slide 129 on which is mounted the parting tool 126. A housing 131 on the radially outward end of the track 128 captures a radial flange 125 on the shaft 132 of a rotatable star wheel 130. A threaded end of the star wheel shaft 132 is received in a threaded bore, visible but unnumbered on the slide 129 such that rotation of the star wheel 130 moves the slide 129 radially with respect to the surface of the pipe 12.

The star wheel 130 is indexed by a longitudinally moveable trip 134 slideable within a housing 136 attachable to a surface of the pinion housing 21. The trip 134 is actuated by a trip lever 138 for selectively engaging or disengaging the trip 134 against a point on the star wheel 130 to thereby index the star wheel on each rotation of rotatable member 16 to radially advance the cutting tool 126 into the surface of the pipe 12.

Figure 9:
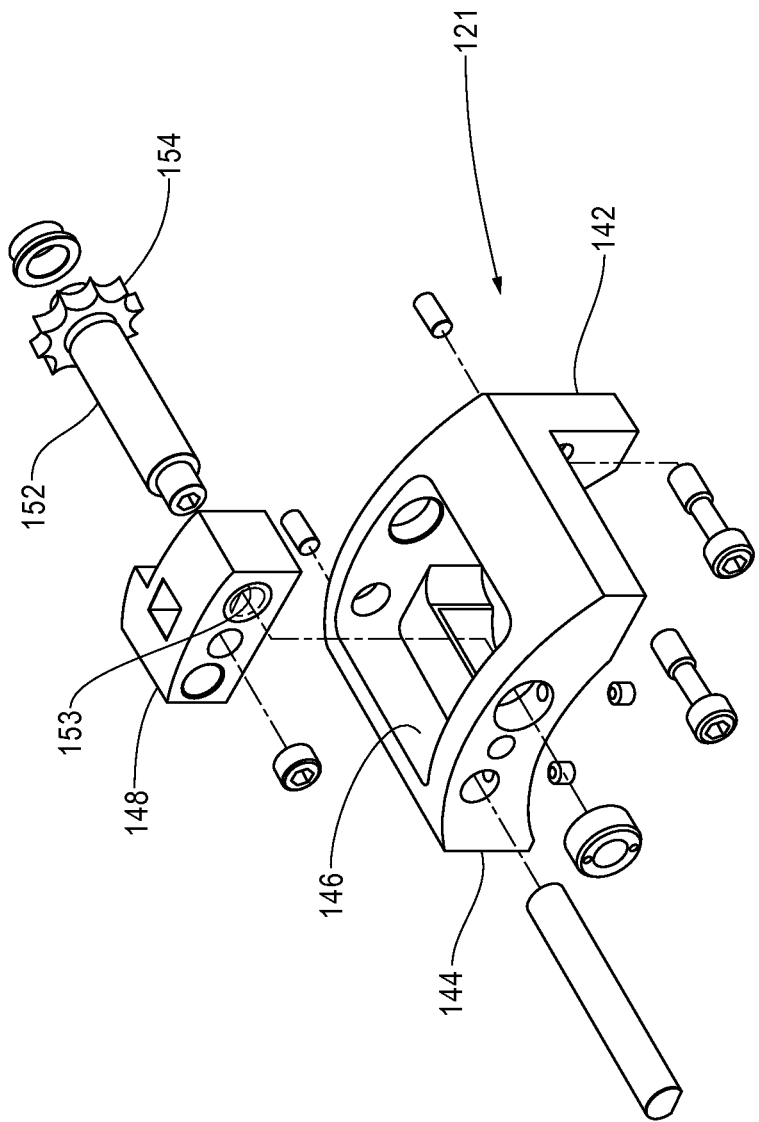
FIG. 9 is an exploded view of an axially moveable tool holder for use with the machine shown in FIG. 1.

Referring to FIGS. 1, 2, and 9, the longitudinally moveable mounting device 121 is suitable for retaining a beveling tool 19 and urging it against a transverse outer end of the pipe 12. The mounting 121 includes a stationary body 142 with surfaces and mounting holes suitable for attachment between the mounting surfaces 111, 112, 117, 118 of the arcuate portions 28, 30. The body 142 includes a longitudinally extending arm 144 having a longitudinal track 146 thereon for slideably retaining a moveable slide 148. Attachable to the slide 148 is the beveling tool 140. The body 142 also rotatably retains the shaft 152 of star wheel 154. The threaded end of the star wheel shaft 152 engages a threaded hole 153 in the slide 148 such that rotation of star wheel 154 moves the slide 148 longitudinally relative to the pipe 12. The star wheel 154 is rotated by a trip mounted in a retainer (not shown) attachable to the pinion housing 21 similar to trip 134. The trip engages one of the points of the star wheel 154 on each rotation of the rotatable member 16 to index the star wheel 154 and longitudinally advance the slide 148 and tool retained thereon.

To work properly the rotating member 16 must rotate coaxial with the stationary member 14 and coaxial with the pipe 12 around which the two members 14,16 are assembled. To do this, the bearings 40 must be positioned with great accuracy, such that the forces against the bearings will be balanced when the device 10 is assembled around the circumference of a pipe 12.

In accordance with the prior art, the radial positioning of the bearings 40 is undertaken by rotating an acentric mounting shaft that bears some similarity to shaft 38 described above with one acentric shaft mounted in every one of the mounting bores 34A-34P. A retaining nut is tightened to lock the orientation of each of the mounting shafts in its associated mounting bore 34A-34P. Where the rotating device 10 had as many as sixteen planetary bearings 40, the bearings of such prior art devices could not be radially positioned so that all sixteen bearings would evenly bear the loads. Furthermore, it has been found that the radial positioning of bearings 40 on prior art devices tended to be lost over a relatively short period of time.

Figure 8:
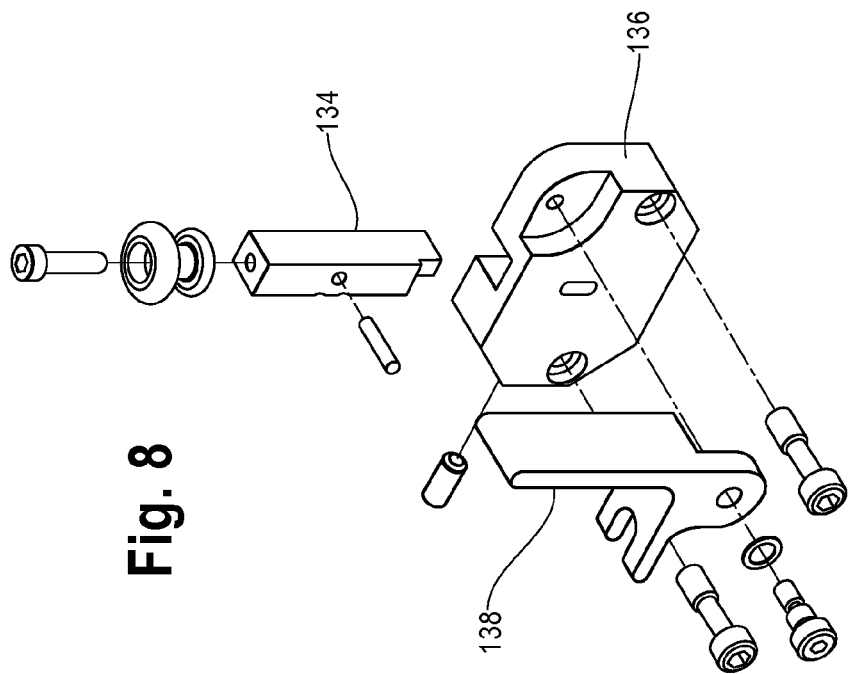
FIG. 8 is an exploded view of a trip for use with the tool holder shown in FIG. 7.
Figure 7:
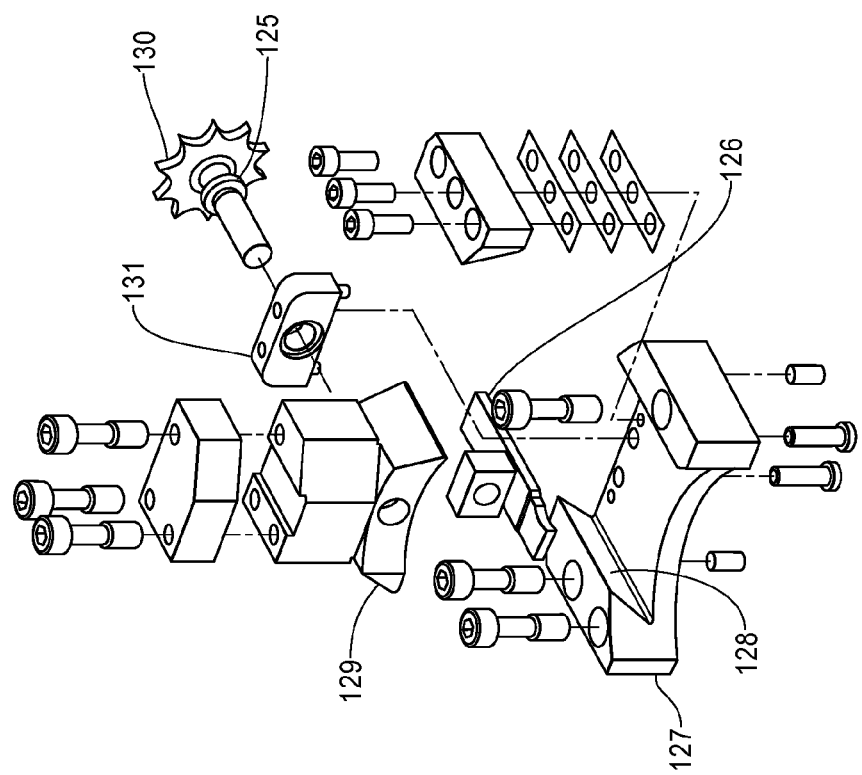
FIG. 7 is an exploded view of the tool holder shown in FIG. 6.

To overcome the forgoing problems, the present invention employs the precision positioning of two of the bores 34A-34P, preferably bores the two positioned near the pinion housing 21, with one precision bore on each side of the pinion housing 21. For a device 10 having sixteen bearings 40, as shown in FIG. 8, the preferred positions for the precision bores are bores 34C and 34F. Since these two bores 34C, 34F are accurately factory positioned on opposite sides of the pinion housing 82, they do not require an offset mounting pin 38 as described above.

Figure 13:
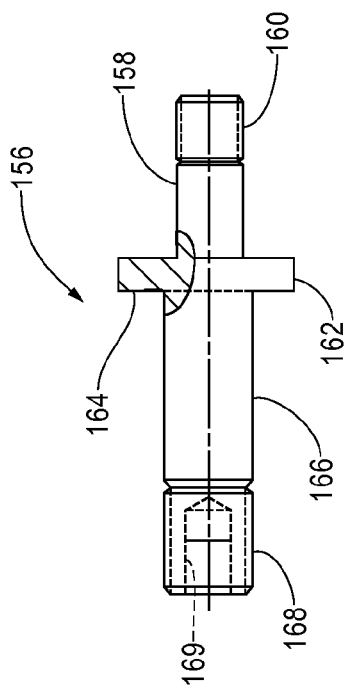
FIG. 13 is a side elevational view of an inline pin for retaining a bearing in the machine shown in FIG. 1.
Figure 14:
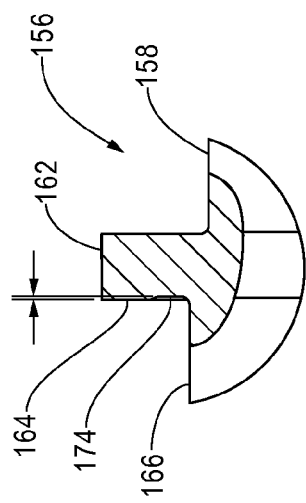
FIG. 14 is a fragmentary enlarged cross-sectional view of the pin shown in FIG. 13.

Referring to FIGS. 13 and 14, in accordance with the present invention, bores 34C, 34F receive a mounting pin 156 having a cylindrical forward end 158 adapted to receive one of the bearings 40 and having a threaded distal end 160 for receiving a nut 47 for retaining the bearing 40 thereto. Rearwardly of the forward end 158, a radial flange 162 having a generally planar rearward surface 164. Extending coaxial with the cylindrical forward end 158 is a cylindrical mounting shank 166 having a threaded distal end 168 for receiving a washer and retaining nut, not shown, to retain the shank 166 in its associated mounting bores 34C, 34F. An axial bore 169 extends into the distal end of the shank 166, the bore 169 having a hex cross section for receiving an Allen wrench, not shown. The Allen wrench is used to hold the mounting pin 156 against rotation as the locking nut, similar to locking nut 60, is tightened to the threaded end 168.

As shown in FIG. 14, the mounting pin 156 also has a radial undercut 174 extending into the rearward surface 164 of the flange 162 such that only the annular outer circumference of the rearward surface 164 abuts the surface 31 of the stationary member 14. Since the forward end 158 of mounting pin 156 is coaxial with the cylindrical shank 166, the mounting pin 156 cannot be radially adjusted by rotating the pin within its associated mounting bore 34C, 34F. To ensure that the mounting pins 156 are not inserted into the wrong holes 34A-34P, the holes 34C, 34F that receive the pins 156 are bored to a slightly larger diameter and the shank 166 of the pins 156 have a complementary larger diameter. The pins 156 that are not acentric therefore have too large of a diameter to fit into the other holes 34A, 34B, 34E, 34G-34P, and will only fit within mounting holes 34C, 34F.

It has been found that by precision positioning two of the mounting holes 34C, 34F, the teeth of the bull gear 102 are correctly positioned with respect to the teeth of the pinion 90. An operator can thereafter adjust the off-center mounting shafts 38 for the remaining bearings by following a pattern that begins opposite the pinion housing 21. The sequence is shown in FIG. 10. When the sequence is followed, the pins 38 can be more accurately and easily radially positioned. The pattern shown in FIG. 10, begins with pin 34L. The sequence for adjusting and tightening the pins 38 is then 34L, 34M, 34K, 34N, 34J, 34O, 34G, 34B, 34I, 34P, 34H, 34A.

It is believed that one of the reasons the present invention overcomes the problems of prior art rotatable pipe machining devices is because of structural problems that develop during the manufacture of such machines. When the planetary mounting holes such as holes 34A-34P are drilled into an annular stationary member, an annular upset is formed around the opening of each of the bores. The upset may be small and not visible to the naked eye. Where a mounting pin 38 is provided that does not have an undercut 56, a fillet remains between the flange and the shank 36 that engages the upset around the circumference of the mounting hole such that the outer circumference of the flange does not rest firmly against the surface 31 of the stationary member 14. As a result, the prior art mounting pins are easily rotated within the mounting holes 34A-34P and thereby lose their radial positioning. Where the acentric mounting pin 38 has an annular undercut 56, the outer circumference of the radial flanges 48 engage the surface 31 of the stationary member 14 and the acentric mounting shafts 38 retain their position, that is, not lose their radial positioning as was the case with the prior art mounting pins.

It should be appreciated that as an alternative to providing an annular undercut 56 around the surface 50 of the radial flange 48, a countersink could be provided near the surface 31 around each of the bores 34A-34P. It has been found, however, that a pin 38 having an annular undercut 56 around the flange 46 is more resistive to losing its setting within mounting bore 34A-34P than a pin without such an undercut in a mounting hole having a countersink.

While it is found that two fixed position holes 34C, 34F are suitable for providing a mounting plan for the radial positioning of the bearings 40 it is believed that comparable positioning can be obtained by precision locating as many as three mounting holes, but no more than three. It is also believed that a single mounting hole is insufficient to provide guidance for the accurate radial positioning of the bearings 40.

While the present invention has been described with respect to a single embodiment, it will be appreciated that many modifications and variations may be made without departing from the spirit and scope of the invention. It is therefore the intent of the appended claims to cover all such modifications and variations which fall within the spirit and scope of the invention.

What is claimed:

1. A machining device comprising
an annular stationary member attachable to a pipe,
an annular rotating member rotatable with respect to said stationary member,
a plurality of rotatable bearings around a circumference of one of said annular members,
said plurality of bearings having outer rims engaging a surface of another of said annular members,
at least one of said plurality of bearings rotatable about an axis that is radially fixed with respect to said first annular member,
a remainder of said plurality of bearings rotatable about axes that are radially adjustable with respect to said first annular member, and
a tool holder on said rotating member for retaining a tool.

2. The machining device of claim 1 wherein both said annular stationary member and said annular rotating member are divided into equal semicircular portions for assembly around a length of pipe.

3. The machining device of claim 1 wherein
said one of said annular members has a plurality of mounting holes therein,
each of said plurality of bearings is retained on a mounting pin having a shank,
each of said mounting holes has a diameter sized to receive said shank of one of said mounting pins, and
said mounting pin for said at least one of said bearings has a shank with a diameter different from a diameter of said shank of said mounting pins for said remainder of said plurality of bearings wherein said mounting pin for said at least one of said bearings will not be received in said mounting holes for said remainder of said plurality of bearings.

4. The machining device of claim 3 wherein two of said plurality of bearings are rotatable about axes that are radially fixed with respect to said first annular member.

5. The machining device of claim 4 and further comprising
a bull gear on said rotatable member,
a pinion on said stationary member, and
said two of said plurality of bearings are mounted on said stationary member with one of said two on each side of said pinion.

6. The machining device of claim 1 wherein
each of said plurality of bearings is mounted on a shaft having a longitudinal axis,
said longitudinal axis of said at least one of said plurality of bearings being coaxial with an axis of rotation of said outer rim thereof, and
said longitudinal axis of a remainder of said plurality of bearings being offset with respect to an axis of rotation of said outer rim thereof.

7. The machining device of claim 5 wherein
said one of said annular members has a plurality of mounting holes therein,
each of said mounting holes has a diameter sized to receive said shaft of one of said bearings, and
said shaft for said at least one of said bearings has a diameter different from a diameter of said shaft of said remainder of said plurality of bearings wherein said shaft for said at least one of said bearings will not be received in said mounting holes for said remainder of said plurality of bearings.

8. The machining device of claim 7 wherein two of said plurality of bearings are rotatable about axes that are radially fixed with respect to said first annular member and said machining device further comprises a bull gear on said rotatable member,
a pinion on said stationary member, and
said two of said plurality of bearings are retained in mounting holes in said stationary member with one of said two on each side of said pinion.

9. The machining device of claim 1 wherein
one of said remainder of said plurality of bearings has a central bore,
and said machining device further comprising
a mounting shaft having a first cylindrical portion received in said central bore and a second cylindrical portion for attachment to said one of said annular members, and an annular flange between said first cylindrical portion and said second cylindrical portion,
a surface of said annular flange having an undercut thereon, and
said surface contacting said one of said annular members.

10. The machining device of claim 9 wherein
said first cylindrical portion has a longitudinal axis that is offset with respect to a longitudinal axis of said second cylindrical portion wherein said one of said remainder of said plurality of bearings is radially adjusted by rotating said mounting shaft within a bore in said one of said annular members.

11. A machining device comprising
an annular stationary member attachable to a pipe,
an annular rotating member rotatable with respect to said stationary member,
a plurality of rotatable bearings around a circumference of one of said annular members,
each of said plurality of bearings having a central opening and an outer rim wherein said outer rims all engage a surface of another of said annular members,
a mounting pin having a first cylindrical portion received in one of said central opening and a second cylindrical portion attachable to said one of said annular members,
a radial flange between said first cylindrical portion and said second cylindrical portion,
said radial flange having an undercut extending into a surface thereof, and
a tool holder on said rotatable member for retaining a tool.

12. The machining device of claim 11 wherein
at least one of said plurality of bearings is rotatable about an axis that is radially fixed with respect to said one of said annular members, and
a remainder of said plurality of bearings rotatable about axes that are radially adjustable with respect to said one of said annular members.

13. The machining device of claim 11 wherein both said stationary member and said annular rotating member are divided into equal semicircular portions for assembly around a length of pipe.

14. The machining device of claim 12 and further comprising
one of said mounting pins for each of said rotatable bearings, and
said mounting pins for said remainder of said plurality of bearings having a longitudinal axis for said first cylindrical section that is parallel to but offset from a longitudinal axis of said second cylindrical section.

15. The machining device of claim 14 wherein
said one of said annular members has a plurality of mounting holes therein,
each of said plurality of bearings has a mounting pin,
each of said mounting holes has a diameter sized to receive said second cylindrical portion of one of said mounting pins,
said mounting pin for said at least one of said bearings having a second cylindrical section with a diameter different from a diameter of said second cylindrical section of said mounting pins of said remainder of said plurality of bearings wherein said mounting pin for said at least one of said bearings will not be received in said mounting holes for said remainder of said plurality of bearings.

16. The machining device of claim 11 wherein two of said plurality of bearings are rotatable about axes that are radially fixed with respect to said first annular member.

17. The machining device of claim 16 and further comprising
a bull gear on said rotatable member,
a pinion on said stationary member, and
said two of said plurality of bearings are mounted on said stationary member with one of said two on each side of said pinion.

18. The machining device of claim 17 wherein
said one of said annular members has a plurality of mounting holes therein,
each of said bearings has a mounting pin,
each of said mounting holes has a diameter sized to receive said second cylindrical portion of one of said mounting pins, and
said mounting pin for said two of said plurality of bearings has a second cylindrical section with a diameter different from a diameter of said second cylindrical section of said mounting pins of said remainder of said plurality of bearings wherein said mounting pin for said two of said plurality of said bearings will not be received in said mounting holes for said remainder of said plurality of bearings.

\* \* \* \* \*